(12) United States Patent
Lozben et al.

(10) Patent No.: US 7,246,356 B1
(45) Date of Patent: Jul. 17, 2007

(54) METHOD AND SYSTEM FOR FACILITATING COMUNICATIONS BETWEEN AN INTERACTIVE MULTIMEDIA CLIENT AND AN INTERACTIVE MULTIMEDIA COMMUNICATION SERVER

(75) Inventors: Slavik Lozben, San Francisco, CA (US); Pritham Shetty, Los Altos, CA (US); Jonathan Gay, Mill Valley, CA (US); Stephen Cheng, Foster City, CA (US); Bradley Edelman, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 812 days.

(21) Appl. No.: 10/353,782

(22) Filed: Jan. 29, 2003

(51) Int. Cl.
*G06F 9/46* (2006.01)
*G06F 15/16* (2006.01)

(52) U.S. Cl. .................. 719/311; 709/205; 709/206; 719/312; 719/313; 719/314; 719/315; 719/318

(58) Field of Classification Search ........ 709/201–207, 709/213–219; 711/147–149; 715/733, 734, 715/753; 719/311–318, 147–149
See application file for complete search history.

(56) References Cited

U.S. PATENT DOCUMENTS

| | | | | |
|---|---|---|---|---|
| 6,148,334 A | * | 11/2000 | Imai et al. ................... | 709/219 |
| 6,163,796 A | * | 12/2000 | Yokomizo .................... | 709/203 |
| 6,549,934 B1 | * | 4/2003 | Peterson et al. ............ | 709/203 |
| 7,003,570 B2 | * | 2/2006 | Messinger et al. .......... | 709/226 |

\* cited by examiner

*Primary Examiner*—William Thomson
*Assistant Examiner*—Charles E Anya
(74) *Attorney, Agent, or Firm*—Fulbright & Jaworski LLP

(57) ABSTRACT

Representative embodiments are disclosed of a system and method for linearly exposing client-server interaction comprising interpreting a function command representing a first group of sequential action requests to an integrated multimedia communication server (iMCS), sequentially transmitting the first group of sequential action requests from an interactive multimedia runtime (iMR) client to the iMCS, wherein a next sequential action request of the first group is transmitted to the iMCS prior to receiving a response message from the iMCS associated with a previous sequential action request of the first group, queuing response messages received from the iMCS, and handling the queued response messages.

14 Claims, 3 Drawing Sheets

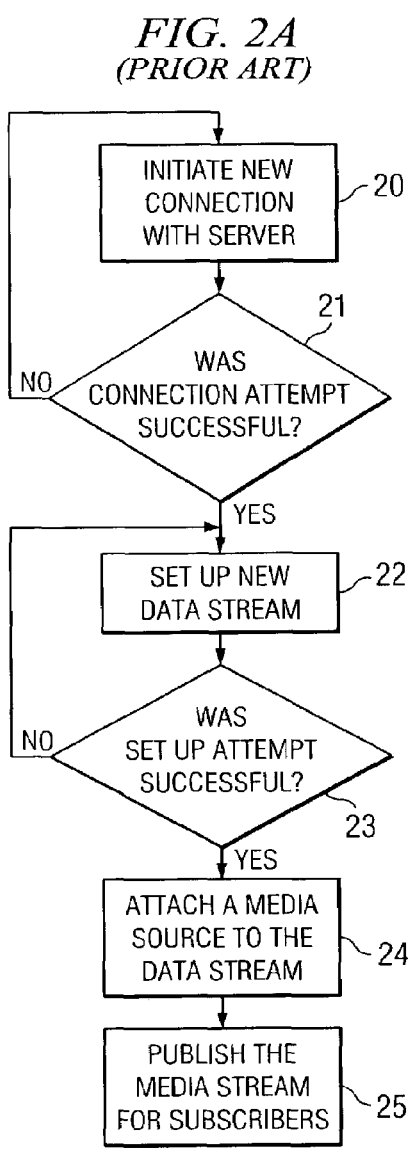
FIG. 2A
(PRIOR ART)
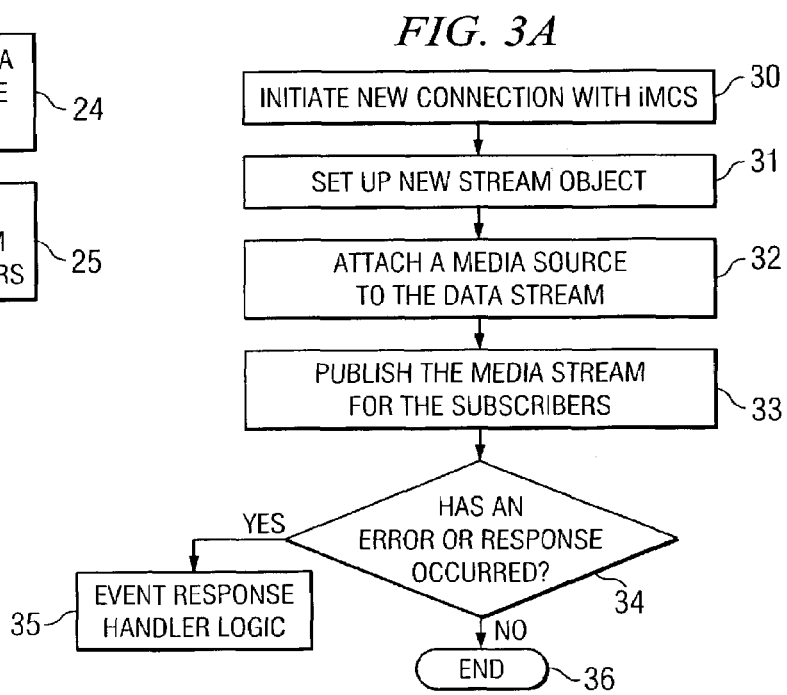
FIG. 2B
(PRIOR ART)
FIG. 3A

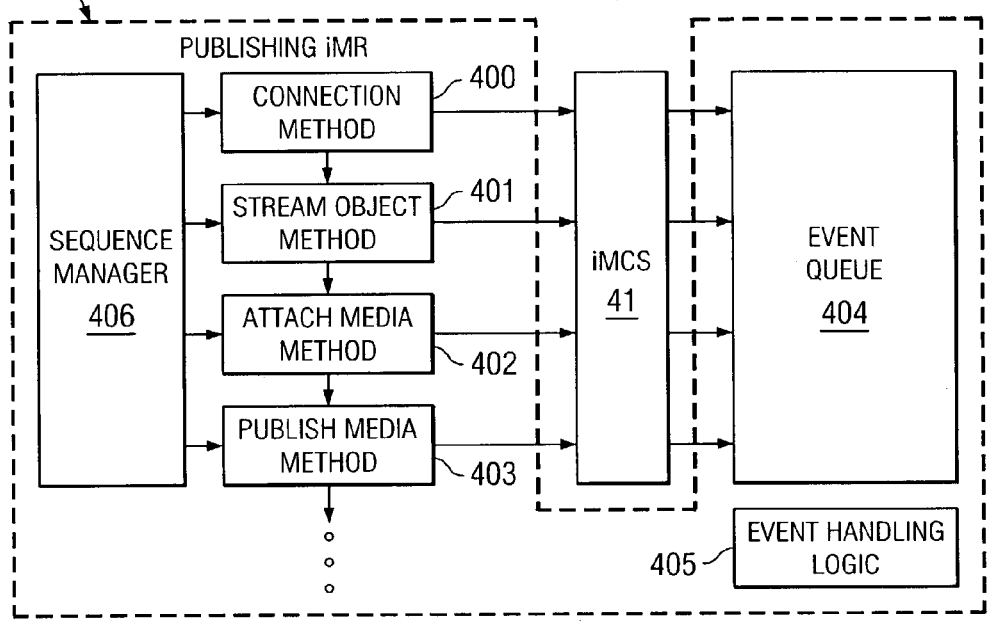

METHOD AND SYSTEM FOR FACILITATING COMUNICATIONS BETWEEN AN INTERACTIVE MULTIMEDIA CLIENT AND AN INTERACTIVE MULTIMEDIA COMMUNICATION SERVER

TECHNICAL FIELD

The present invention relates, in general, to client-server systems and, more particularly, to a server proxy object creation model for managing client-server interaction.

BACKGROUND OF THE RELATED ART

In the realm of computing, the relationship that drives most useful applications is the client-server relationship. The interaction between client and server allows most computing beyond an unconnected, single computer. The client-server relationship defines an architecture in which a user's computer, which may be a personal computer (PC), may be the client machine or entity requesting something from a server, which is the supplying machine or entity. However, a PC may also operate as the server side of the client-server relationship. Both are typically connected via some kind of network, such as a local area network (LAN) or wide area network (WAN).

In the client-server model, the client typically processes the user interface (WINDOWS™, MACINTOSH™, etc.) and may perform some or all of the application processing. Servers may range in capacity from high-end PCs to mainframes. A database server typically maintains databases and processes requests from the client to extract data from or to update the database. An application server, which is a software server, typically provides additional business processing for the clients.

While many client-server models are now commonly referred to as "Web based" and/or "Web enabled," the architecture is conceptually the same. Users' PCs may still be clients, and there are tens of thousands of Web servers throughout the Internet delivering Web pages and other functionality. On the Web, the client typically runs the browser and, just like legacy client/server systems, can perform a little or a lot of processing, such as simply displaying hypertext mark-up language (HTML) pages, processing embedded scripts, or considerable processing with JAVA™ applets. A myriad of browser plug-ins provide all sorts of possibilities for client processing.

The server side of the Web is typically a multi-tiered server architecture with interlinked Web servers, application servers, database servers, and caching servers. In developing network applications that are offered on the Web, the developer typically codes all aspects of communication between the client and server. Actions intended for the client may depend on responses or actions on the server. Similarly actions on the server may depend on actions or responses from the client. This architecture produces an asynchronous event model. If step 1 is dependent on a response from the server, the process grinds to a halt, and step 2 will be delayed until the response for step 1 has been received.

The programming model for dealing with the asynchronous nature of the client-server architecture may be awkward even to experienced programmers. Therefore, the development of applications which include client-server interaction have generally been reserved for experienced programmers.

BRIEF SUMMARY

Representative embodiments of the present invention are directed to a method for linearly exposing client-server interaction comprising interpreting a function command representing a first group of sequential action requests to an integrated multimedia communication server (iMCS), sequentially transmitting the first group of sequential action requests from an interactive multimedia runtime (iMR) client to the iMCS, wherein a next sequential action request of the first group is transmitted to the iMCS prior to receiving a response message from the iMCS associated with a previous sequential action request of the first group, queuing response messages received from the iMCS, and handling the queued response messages.

Additional representative embodiments are directed to a user-accessible system for managing communication in an interactive multimedia application environment (iMAE) network comprising an iMR client, an iMCS in communication with the iMR; an event response queue for storing event response signals from the iMCS, a plurality of user-selectable functions, each of the functions abstracting an associated set of server interaction requests, and a sequence manager within the iMR for directing sequential execution of the set of server interaction requests of first selected ones of the plurality of functions prior to sequentially receiving event response signals associated with the set of server interaction requests from the iMCS.

Further representative embodiments are directed to a computer program product having a computer readable medium with computer program logic recorded thereon, the computer program product comprising code for abstracting into a single function, a defined sequence of communication interactions between an iMR and an iMCS, code for abstracting into at least one other single function, at least one other defined sequence of communication interactions between the iMR and the iMCS, code for sequentially calling the single function and the at least one other single function by the iMR prior to completion of the defined sequence of communication interactions, and code for queuing responses from the iMCS.

Further representative embodiments are directed to a method for controlling communication interactions between an iMR client and an iMCS in programming computer applications, the method comprising making a set of functions available to a user, wherein each of the functions represents an abstraction of one or more of the communication interactions, executing ones of the set of functions selected by the user for performing a desired task, wherein a next selected function is sequentially executed regardless of completion of each of the communication interactions associated with a prior selected function, and queuing information received on completion the one or more communication interactions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 2A is a flowchart illustrating the logic steps implementing the use of callbacks to manage the client-server relationship;

FIG. 2B is a partial script illustrating example pseudo code that may be used to implement the callback method of FIG. 2A;

FIG. 3A is a flowchart illustrating example logic steps for managing the client-server relationship in a linear fashion;

FIG. 3B is a partial script illustrating example pseudo code that may be used to implement the embodiment described in FIG. 3A;

FIG. 4 is a block diagram illustrating a functional relationship between an iMR and an iMCS configured according to additional embodiments of the technology described herein; and FIG. 5 illustrates a computer system adapted to use various embodiments of the present invention

DETAILED DESCRIPTION

Figure 1A:
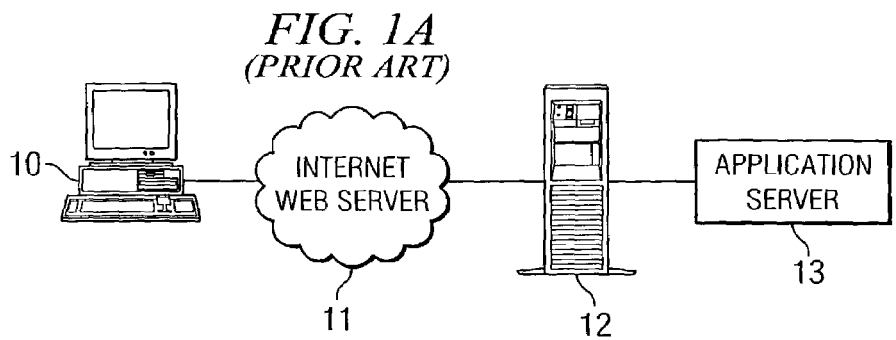
FIG. 1A is a block diagram illustrating one example of a typical client-server relationship.

Before discussing the present invention in greater detail, it is appropriate to discuss the operations of the typical client-server architecture. FIG. 1A is a block diagram illustrating one example of a typical client-server relationship. Client 10 may access server 12 via Internet Web server 11. As client 10 executes steps that may be processed remotely by application server 13 being run on server 12, client 10 accesses Internet Web server 11 using an address for application server 13. Once application server 13 is located, a handshaking routine occurs to establish the connection between client 10, Internet Web server 11, server 12, and application server 13. Application server 13 then processes the information delivered from client 10 and returns any information or response to client 10 in a similar manner.

Figure 1B:
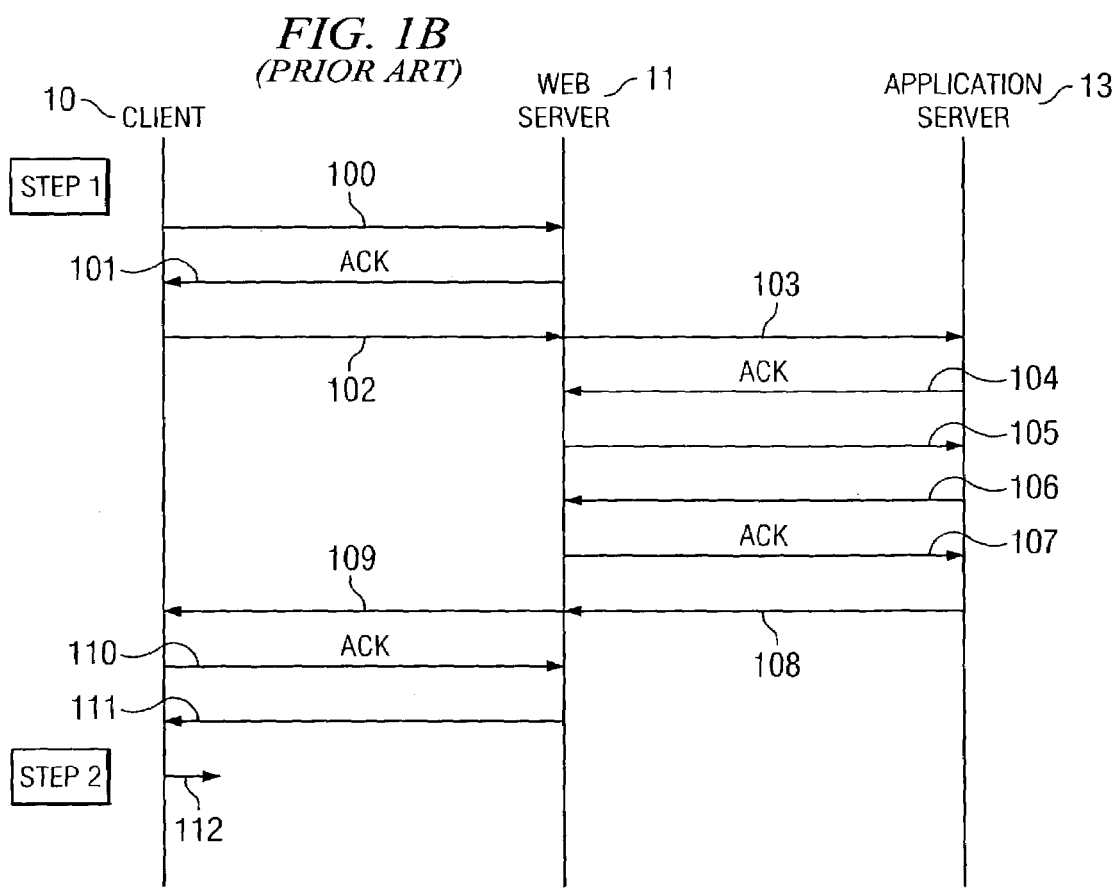
FIG. 1B is a timing graph illustrating a typical communication exchange between a client and an application server.

FIG. 1B is a timing graph illustrating simplified communication exchange between client 10 and application server 13. For purposes of this example, the communication routines with server 12 have been incorporated generally into the communications with application server 13. Before client 10 can execute Step 1, polling signal 100 is sent to Web server 11. If Web server 11 correctly receives polling signal 100, it responds to client 10 with ACK signal 101 to acknowledge correct receipt of polling signal 100 and indicating that it's ready to proceed with communication. Upon receiving ACK signal 101 from Web server 11, client 10 sends data signal 102 to Web server 11. Once Web server 11 receives data signal 102 from client 10, it must establish communication with application server 13. Web server 11 sends polling signal 103 to application server 13. If application server 13 correctly receives polling signal 103, it will send ACK signal 104 acknowledging correct receipt of polling signal 103 and indicating that it's ready to proceed with communication. As Web server 11 receives ACK signal 104, it can then send data signal 105 to application server 13. With the data received in data signal 105, application server 13 may perform some kind of processing on that data.

When application server 13 finishes processing the data for Step 1, it sends polling signal 106 to Web server 11 to establish communications again. If Web server 11 correctly receives polling signal 106, it will send ACK signal 107 back to application server 13 to acknowledge correct receipt of polling signal 106 and indicating that it's ready to proceed with communication. Application server 13 may then transmit data signal 108 to Web server 11 containing the processed data for Step 1. Once Web server 11 receives data signal 108 from application server 13, it must re-establish communication with client 10. To do so, Web server 11 sends polling signal 109 to client 10. If client 10 correctly receives polling signal 109, it will transmit ACK signal 110 to Web server 11 to acknowledge correct receipt of polling signal 109 and indicating that it's ready to proceed with communication. As communication is re-established between Web server 11 and client 10, Web server sends the processed data for Step 1 back to client 10. The process then begins over again with Step 2, by client 10 sending polling signal 112 to Web server 11.

It should be noted that variations of the communication process as described in FIG. 1B are also possible. For example, client 10 may work through polling and acknowledgement signals to establish communication directly with application server 13. Some network embodiments may also provide for a communication channel to remain open once established. Furthermore, even if communication is established with application server 13, application server 13 may be occupied by another processing request, thus, causing the request from client 10 to be queued for processing. In each such case, client 10 submits its request for processing and then must wait until some kind of confirmation is received from one of the servers before proceeding to the next step. Considering operation on a higher level, a client issuing a processing request must also simply wait until the processing has been completed and returned. This communication model yields asynchronous interactions between accessing entities and applications, in which the process stalls each time a call to the server is made to wait for the server response.

One programming method that has been used to address the asynchronous client-server interaction is through the use of callbacks. FIG. 2A is a flowchart illustrating the logic steps implementing the use of callbacks to manage the client-server relationship. In step 20, a new connection with the server is initiated. In step 21, the system must determine whether the connection initiation has been successful. If the attempt fails, the system either repeats the initiation step of step 20, or can default to some other error handling system. If the attempt is successful, the system sets up a new data stream object in step 22. In step 23, the system must again determine whether the attempted stream object set up was successful. If the attempt fails, the system either repeats step 22 or is directed to an error handling system. If the attempt is successful, the system then attaches a media source to the data stream in step 24 and publishes the media stream for the subscribers in step 25.

FIG. 2B is a partial script illustrating example pseudo code that may be used to implement callback method 26 of FIG. 2A. Code blocks 200-202 represent the application programming interface (API) pseudo code for the three essential functions for this partial script: (1) initiating communication with the server, 200; (2) setting up a new data stream, 201; and (3) publishing a media stream that has been attached to the data stream, 202. The process is started at line 211 by invoking function Step 1( ). In function Step 1( ), line 203 calls for the initiation of a new connection object. The connection object is used to invoke connect method 204 for connecting to an application addressed at rtmp://server/app. Connect method 204 also includes a call to function Step 2( ) 205. If the connection has been successful, then successFlag allows a new stream object to be initiated on the connection in constructor method 206. Constructor method 206 also includes a call to function Step 3( ) 207. Alternatively, if the connection attempt was unsuccessful, the failure would be handled by error code 208, represented by the comment "handle failure" in the example. If the stream object has been successfully created on the connection, then successFlag allows the publishing of an attached video stream to the stream object in block 209. Alternatively, if the stream object was not successfully created, the failure would be handled by error code 210, represented by the comment "handle failure" in the example. It should be noted that in implementations of the described example, actual code for handling any errors would be included.

This type of asynchronous programming model can be quite complex. For Web designers used to tag-based scripting languages, the advanced techniques used by computer programmers for implementing the asynchronous client-server relationship has since kept true client-server application development out of the hands of the typical tag-based programmer. However, instead of relying on the complexities of the asynchronous programming model, one embodiment described herein captures the same function using a linear model.

FIG. 3A is a flowchart illustrating example logic steps for managing the client-server relationship in a linear fashion. Many of the methods invoked at the publishing interactive multimedia runtime (iMR) are sequential action requests transmitted from the iMR to an interactive multimedia communication server (iMCS) requesting processing, data, or service. In step 30, the iMR calls the method to initiate a new connection with the iMCS. Once the method for initiating the invention has been called, the system manages the client-server by abstracting the underlying client-server interaction to the developer. To implement this abstraction, the system assumes that once the connection method has been called, the connection will be successful. This assumption allows the iMR to continue immediately to step 31 for setting up a stream object on the connection. Again, the client-server interaction is abstracted to the developer by assuming the stream object creation will be successful. The abstraction again allows the iMR to continue immediately to step 32 to attach/associate an actual media source, such as a live capture device (e.g., camera, microphone, and the like), or a recorded or saved file, to the stream object. In step 33, the media stream is published on the iMCS for the subscribers. Because the abstraction does not effect the possibility that the connection or object creation may fail, there may be some handler for any responses or errors that may occur because of an unsuccessful action. In step 34, a determination is made whether any of the called methods returned a response or error. If a response or error has occurred, the responses or errors are directed to an event response handler in step 35. If no errors were encountered, the process then stops, in step 36, until another sequential action request is transmitted between the iMR and the iMCS.

FIG. 3B is a partial script illustrating example pseudo code 37 that may be used to implement the embodiment described in FIG. 3A. The linearly exposed model for managing client-server interactions, supported by the inventive concept, results in a more straight forward code implementation. The code is generally written to be executed sequentially, line by line. In line 300, a new connection object is initiated on the publishing iMR. Block 301 represents the event response handling portion of example pseudo code 37. If the attempted connection were to fail, the on Status event response handler method directs the system to the code implemented to handle the failure. In other instances, a called method may return a response in which case the response will be handled and may be queued by the event response handler. In line 302, a connection is initiated with the application on the iMCS at rtmp://server/app. In step 303, a new stream object is initiated. In step 304, a video object is attached to the stream object and then the video stream is published, in step 305, for the subscribers. As can be seen from example pseudo code 37, the described embodiment provides a linear process for publishing a desired media object. The event response handling is included, but does not disrupt the flow of the underlying process. The API model that may be supported by the described embodiment provides a more intuitive approach to the client-server relationship that would be more suitable for tag-based programmers.

The abstraction presented by the described embodiment is implemented in part through the use of an event response queue. FIG. 4 is a block diagram illustrating a functional relationship between publishing iMR 40 and iMCS 41 configured according to additional embodiments of the technology described herein. Publishing iMR 40 is the container for calling the methods connected with publishing the media stream on iMCS 41. The API is preferably executable on both iMR 40 and iMCS 41. Connection method 400 is called to open a connection with iMCS 41. The logic underlying connection method 400 attempts to establish communication with iMCS 41. Instead of interrupting the program flow, any errors, unsuccessful server interactions, or server responses, are passed from iMCS 41 to event queue 404. Any such errors will therefore be queued for handling in due course by event handling logic 405.

Without the interruptive event handling, the remainder of the publishing methods may be called in a linear progression. Stream object method 401 initiates a new stream object on the connection. Attach media method 402 attaches a specific media resource, whether live or pre-recorded, to the new stream object to form a media stream. Publish media method 403 then publishes the media stream on iMCS 41 making the media stream available to clients for subscription. Sequence manager 406 assists in the processing by directing publishing iMR 40 to sequence from step to step prior to receiving responses or acknowledgements from iMCS 41. Because the programming structure for publishing the desired media is now representable in a linear fashion, the typical or even novice tag-based programmer would preferably be capable of coding, what has typically been a complex asynchronous event system, in only a few lines of code.

The ability to present developers with a linear model for managing client-server interactions is supported by the abstraction of certain defined sequences of communication interactions between an iMR and an iMCS. For example, referring to FIG. 1B, Step 1, which is accomplished by executing the signaling interactions shown in signals 100-111, the first defined sequence of communication interactions, may comprise each of signals 100-111. For purposes of this example only, assume that Step 1 is a function for establishing a connection between an iMR and an iMCS. In representative embodiments of the present invention, signals 100-111 may be abstracted to the function/method "nc.connect("rtmp://server/app")" shown in line 302 of FIG. 3B. Thus, the method connect would represent signals 100-111 from, FIG. 1B. The user, however, only sees the connect method and does not have to be experienced enough to explicitly handle signals 100-111. The second defined sequence of communication interactions may begin with signal 112 for Step 2. In the same manner as for Step 1, the signals that define Step 2 may be abstracted into a single function that is presented to the user/developer.

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, and the like. The code segments may be downloaded via computer networks such as the Internet, Intranet, and the like.

FIG. 5 illustrates computer system 500 adapted to use the present invention. Central processing unit (CPU) 501 is coupled to system bus 502. The CPU 501 may be any general purpose CPU, such as an INTERNATIONAL BUSINESS MACHINE (IBM) POWERPC™, INTEL™ PENTIUM™-type processor, or the like. However, the present invention is not restricted by the architecture of CPU 501, as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, EEPROM, Flash ROM, or the like. RAM 503 and ROM 504 hold user and system data and programs as is well known in the art.

Bus 502 is also coupled to input/output (I/O) controller card 505, communications adapter card 511, user interface card 508, and display card 509. The I/O adapter card 505 connects to storage devices 506, such as one or more of a hard drive, a CD drive, a floppy disk drive, a tape drive, to the computer system. The I/O adapter 505 would also allow the system to print paper copies of information, such as documents, photographs, articles, etc. Such output may be produced by a printer (e.g. dot matrix, laser, and the like), a fax machine, a copy machine, or the like. Communications card 511 is adapted to couple the computer system 500 to a network 512, which may be one or more of a telephone network, a local (LAN) and/or a wide-area (WAN) network, an Ethernet network, and/or the Internet network. User interface card 508 couples user input devices, such as keyboard 513, pointing device 507 to the computer system 500. The display card 509 is driven by CPU 501 to control the display on display device 510.

It should be noted that while many of the examples included herein have described a process for opening and publishing a media stream to a multimedia communication server, the embodiments of the present invention may be used to implement any task or feature of client-server interaction. Instead of publishing a media stream, a client may request data retrieval and processing from the communication server, or other such processing or services, the present invention is not limited solely to publication of media streams. Furthermore, while the examples scripts have been provided in pseudocode, it should be noted that computer languages, such as MACROMEDIA's ACTIONSCRIPT™ and other similar computer language may be used to implement the various embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for linearly exposing client-server interaction comprising:

interpreting, at an interactive multimedia runtime (iMR) client, a function command representing a first group of sequential action requests to an interactive multimedia communication server (iMCS);

sequentially transmitting said first group of sequential action requests from an interactive multimedia runtime (iMR) client to said iMCS, wherein a next sequential action request of said first group is transmitted to said iMCS prior to receiving a response message from said iMCS associated with a previous sequential action request of said first group;

directing said iMR client to proceed to a subsequent sequential action request of another group of sequential action requests before receiving all response messages for said first group, wherein said subsequent sequential action requests of said first group and said another group include handshaking signals;

sequentially transmitting said another group of sequential action requests from said iMR client to said iMCS, wherein a next sequential action request of said another group is transmitted to said iMCS prior to receiving a response message from said iMCS associated with a previous sequential action request of said another group;

queuing response messages received from said iMCS; and
handling said queued response messages.

2. The method of claim 1 further comprising:

handling said queued response messages according to a response handling logic.

3. A user-accessible system for managing communication in an interactive multimedia application environment (iMAE) network comprising:
- an interactive multimedia runtime (iMR) client;
- an interactive multimedia communication server (iMCS) in communication with said iMR;
- an event response queue for storing event response signals from said iMCS;
- a plurality of user-selectable functions, each of said plurality of user-selectable functions abstracting an associated sequence of handshaking signals for establishing a connection between said iMR client and said iMCS; and
- a sequence manager within said iMR for directing sequential execution of said sequence of handshaking signals of first selected ones of said plurality of user-selectable functions prior to sequentially receiving event response signals associated with said sequence of handshaking signals from said iMCS, wherein said sequence manager directs said iMR client to proceed to a sequence of handshaking signals of a second user-selectable function of said plurality of user-selectable functions before receiving all response messages for a sequence of handshaking signals of a first user-selectable function of said plurality of user-selectable functions, and wherein said sequence manager directs said iMR to sequentially transmit said sequence of handshaking signals of said second user-selectable function from said iMR client to said iMCS such that a next sequential handshaking signal of said second user-selectable function is transmitted to said iMCS prior to receiving a response message from said iMCS associated with a previous sequential handshaking signal of said second user-selectable function.

4. The system of claim 3 wherein said sequence manager further directs sequential execution of additional selected ones of said plurality of functions prior to receiving all event response signals associated with said first selected ones of said plurality of functions.

5. The system of claim 3 further comprising:
- an event handler for handling event response signals disposed in said event response queue.

6. The system of claim 5 wherein said event handler is located within said iMCS.

7. The system of claim 3 wherein said event response queue is located within said iMR.

8. A computer program product having a computer readable medium with computer program logic recorded thereon, said computer program product comprising:
- code for abstracting into a single function, a defined sequence of handshaking signals for establishing a connection between an interactive multimedia runtime (iMR) and an interactive multimedia communication server (iMCS);
- code for abstracting into at least one other single function, at least one other defined sequence of handshaking signals between said iMR and said iMCS;
- code for sequentially calling said single function and said at least one other single function by said iMR prior to completion of said defined sequence of handshaking signals, wherein said code for sequentially calling said single function and said at least one other single function directs said iMR to proceed to a handshaking signal of said at least one other single function before receiving all response messages for said handshaking signals of said single function, and wherein said code for sequentially calling said single function and said at least one other single function directs said iMR to sequentially transmit said handshaking signals of said at least one other single function from said iMR client to said iMCS, wherein a next handshaking signal of said at least one other single function is transmitted to said iMCS prior to receiving a response message from said iMCS associated with a previous handshaking signal of said at least one other single function; and
- code for queuing responses from said iMCS.

9. The computer program product of claim 8 further comprising:
- code for handling said queued responses.

10. The computer program product of claim 8 further comprising:
- code for presenting to a user said code for abstracting into a single function and said code for abstracting into at least one other single function, wherein said user selects combinations of said single function and said at least one other single function to execute a desired server communication task.

11. A method for controlling communication interactions between an interactive multimedia runtime (iMR) client and an interactive multimedia communication server (iMCS) in programming computer applications, said method comprising:
- making a set of functions available to a user, wherein each of said functions represents an abstraction of one or more sets of handshaking signals for establishing one or more connections involved in said communication interactions;
- executing ones of said set of functions selected by said user for performing a desired task, wherein a next selected function is sequentially executed regardless of completion of each of said communication interactions associated with a prior selected function, wherein said executing includes directing said iMR client to proceed to a handshaking signal of a second function of said set of functions before receiving all handshaking signal responses for a first function of said set of functions, and sequentially transmitting handshaking signals of said second function of said set of functions from said iMR client to said iMCS, wherein a next sequential handshaking signal of said second function is transmitted to said iMCS prior to receiving a handshaking signal response from said iMCS associated with a previous handshaking signal of said second function of said set of functions; and
- queuing information received on completion of said one or more communication interactions.

12. The method of claim 11 wherein said communication interactions comprise:
- an action request issued to said iMCS by said iMR; and
- a response message associated with said action request issued from said iMCS.

13. The method of claim 12 wherein said response message comprises an error statement.

14. The method of claim 11 further comprising:
- handling said queued information.

* * * * *

UNITED STATES PATENT AND TRADEMARK OFFICE
CERTIFICATE OF CORRECTION

| | | |
|---|---|---|
| PATENT NO. | : 7,246,356 B1 | Page 1 of 1 |
| APPLICATION NO. | : 10/353782 | |
| DATED | : July 17, 2007 | |
| INVENTOR(S) | : Slavik Lozben et al. | |

It is certified that error appears in the above-identified patent and that said Letters Patent is hereby corrected as shown below:

On the Title page, Item (54) Title:

Delete "COMUNICATIONS" and replace with --COMMUNICATIONS--.

Column 1, line 2, located in the title, delete "COMUNICATIONS" and replace with --COMMUNICATIONS--.

Signed and Sealed this

Twenty-eighth Day of August, 2007

JON W. DUDAS
*Director of the United States Patent and Trademark Office*